US012807853B2

(12) United States Patent
DiMondo

(10) Patent No.: US 12,807,853 B2
(45) Date of Patent: Nov. 24, 2026

(54) MODIFICATION OF ASPHALT ADHESIVES WITH WAXES

(71) Applicant: GreenMantra Recycling Technologies Ltd., Brantford (CA)

(72) Inventor: Domenic DiMondo, Brantford (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 312 days.

(21) Appl. No.: 16/782,045

(22) Filed: Feb. 4, 2020

(65) Prior Publication Data

US 2020/0172779 A1 Jun. 4, 2020

Related U.S. Application Data

(63) Continuation of application No. PCT/CA2018/051058, filed on Aug. 31, 2018.

(60) Provisional application No. 62/553,357, filed on Sep. 1, 2017.

(51) Int. Cl.

| | |
|---|---|
| ***C09J 7/30*** | (2018.01) |
| ***B32B 5/16*** | (2006.01) |
| ***B32B 5/30*** | (2006.01) |
| ***B32B 7/06*** | (2019.01) |
| ***B32B 17/06*** | (2006.01) |
| ***B32B 27/08*** | (2006.01) |
| ***C09J 7/29*** | (2018.01) |
| ***C09J 195/00*** | (2006.01) |
| ***E02D 31/02*** | (2006.01) |
| ***E04D 12/00*** | (2006.01) |

(52) U.S. Cl.

CPC ............... *C09J 195/00* (2013.01); *B32B 5/16* (2013.01); *B32B 5/30* (2013.01); *B32B 7/06* (2013.01); *B32B 17/068* (2013.01); *B32B 27/08* (2013.01); *C09J 7/29* (2018.01); *C09J 7/30* (2018.01); *E02D 31/02* (2013.01); *E04D 12/002* (2013.01); *B32B 2419/06* (2013.01); *C09J 2301/408* (2020.08); *C09J 2423/04* (2013.01); *C09J 2423/10* (2013.01); *C09J 2495/00* (2013.01); *Y10T 428/141* (2015.01); *Y10T 428/1476* (2015.01); *Y10T 428/2848* (2015.01); *Y10T 442/3626* (2015.04)

(58) Field of Classification Search

None

See application file for complete search history.

(56) References Cited

U.S. PATENT DOCUMENTS

| | | | | |
|---|---|---|---|---|
| 2,549,538 | A | 4/1951 | Sparks et al. | |
| 2,835,659 | A | 5/1958 | Guillet | |
| 3,033,256 | A | 5/1962 | Schrenk | |
| 3,143,536 | A | 8/1964 | Guzzetta et al. | |
| 3,278,513 | A | 10/1966 | Jahrstorfer et al. | |
| 3,332,926 | A | 7/1967 | Baron et al. | |
| 3,345,352 | A | 10/1967 | Baron et al. | |
| 3,411,179 | A | 11/1968 | Gregory et al. | |
| 3,424,822 | A | 1/1969 | Liston | |
| 3,441,628 | A | 4/1969 | Raetzsch et al. | |
| 3,642,722 | A | 2/1972 | Knowles et al. | |
| 3,927,693 | A | 12/1975 | Johnston | |
| 3,962,092 | A | 6/1976 | Newman | |
| 4,053,141 | A | 10/1977 | Gussefeld | |
| 4,059,525 | A | 11/1977 | Krasnow | |
| 4,105,806 | A | 8/1978 | Watt | |
| 4,127,619 | A | 11/1978 | Godfrey | |
| 4,136,251 | A | 1/1979 | Bice et al. | |
| 4,177,177 | A | 12/1979 | Vanderhoff et al. | |
| 4,178,272 | A | 12/1979 | Meyer et al. | |
| 4,208,252 | A | 6/1980 | Yoshida et al. | |
| 4,497,921 | A * | 2/1985 | Chang .................... | D21H 19/22 524/70 |
| 4,525,216 | A | 6/1985 | Nakanishi | |
| 4,620,032 | A | 10/1986 | Doerr | |
| 4,642,401 | A | 2/1987 | Coenen et al. | |
| 4,847,209 | A | 7/1989 | Lewis et al. | |
| 4,911,952 | A | 3/1990 | Doane et al. | |
| 5,158,982 | A | 10/1992 | Stapp | |
| 5,292,862 | A | 3/1994 | Miura et al. | |
| 5,314,741 | A | 5/1994 | Roberts et al. | |
| 5,315,055 | A | 5/1994 | Butcher et al. | |
| 5,354,930 | A | 10/1994 | Atkins et al. | |
| 5,369,215 | A | 11/1994 | Platz | |
| 5,386,055 | A | 1/1995 | Lee et al. | |

(Continued)

FOREIGN PATENT DOCUMENTS

| | | | |
|---|---|---|---|
| AU | 2017218908 | A1 | 8/2018 |
| CA | 2098778 | A1 | 12/1993 |

(Continued)

OTHER PUBLICATIONS

Product data sheet for Ceranovus A from Greenmantra Technologies, retrived on Feb. 12, 2024 (Year: 2024).*

News Release from PR Newswire “GreenMantra™ Technologies Introduces New Ceranovus™ Polypropylene Waxes with Unique and Customizable Technical Properties”, May 24, 2017 (Year: 2017).*

Machine translation of KR101487772 B1, Jan. 30, 2015 (Year: 2015).*

PCT/CA2020/051166 Search Report and Written Opinion dated Nov. 30, 2020 “ISR20201130”.

U.S. Appl. No. 16/140,169 Notice of Allowance dated Aug. 19, 2020 “USNOA20200819”.

U.S. Appl. No. 16/293,792 Office Action dated Dec. 11, 2020 “USOA20201211A”.

(Continued)

*Primary Examiner* — Anish P Desai

(74) *Attorney, Agent, or Firm* — Cook Alex Ltd.

(57) ABSTRACT

Wax-modified asphalt can be employed in peel-and-stick sheets. In some embodiments, the method includes adding a wax to an asphalt blend. The addition of wax can result in an asphalt having lower viscosity, higher softening point, improved compatibility, and/or stronger adhesion properties. These changes can be achieved in addition to maintaining both low and high temperature stability of the asphalt adhesive. In some embodiments, the wax is made from a recycled plastic.

7 Claims, 5 Drawing Sheets

(56) References Cited

U.S. PATENT DOCUMENTS 5,481,052 A 1/1996 Hardman et al.
5,502,263 A 3/1996 Ponsford et al.
5,608,136 A 3/1997 Maezawa et al.
5,656,757 A 8/1997 Jenczewski et al.
5,672,794 A 9/1997 Northemann
5,728,909 A 3/1998 Butcher, Jr.
5,731,483 A 3/1998 Stabel et al.
5,821,395 A 10/1998 Price et al.
5,830,927 A 11/1998 Vanderhoff et al.
5,849,964 A 12/1998 Holighaus et al.
5,876,644 A 3/1999 Nichols et al.
5,990,206 A 11/1999 Tanaka et al.
6,143,940 A 11/2000 Miller et al.
6,150,577 A 11/2000 Miller et al.
6,172,271 B1 1/2001 Horizoe et al.
6,172,275 B1 1/2001 Tadauchi et al.
6,184,427 B1 2/2001 Klepfer et al.
6,211,331 B1 4/2001 Craig
6,268,046 B1 7/2001 Miller et al.
6,288,296 B1 9/2001 Miller et al.
6,822,126 B2 11/2004 Miller et al.
7,834,226 B2 11/2010 Miller
7,893,307 B2 2/2011 Smith
7,923,506 B2 4/2011 Cohoon et al.
7,951,239 B2 5/2011 Trumbore et al.
8,168,839 B2 5/2012 Niu
8,206,500 B1 6/2012 Mathis et al.
8,609,778 B1 12/2013 Frost et al.
8,664,458 B2 3/2014 Kumar et al.
8,680,167 B2 3/2014 Agarwal et al.
9,090,829 B1 7/2015 McGrevy et al.
9,200,130 B2 12/2015 D'Amato et al.
9,353,476 B2 5/2016 Henriksson et al.
9,598,610 B2 3/2017 Hilsenbeck
9,631,153 B2 4/2017 Unger et al.
9,714,385 B2 7/2017 Khan et al.
10,000,715 B2 6/2018 Kumar et al.
10,308,896 B2 6/2019 Scheibel et al.
10,358,603 B1 7/2019 Pour
10,457,602 B1 10/2019 Davis
10,457,886 B2 10/2019 Kumar et al.
10,472,487 B2 11/2019 Gil et al.
10,519,292 B2 12/2019 Yao et al.
10,597,507 B2 3/2020 Mondo et al.
10,723,858 B2 7/2020 Yao et al.
10,870,739 B2 12/2020 Di Mondo
10,907,353 B2 2/2021 LaTorre et al.
11,046,613 B2 6/2021 Davis
11,072,676 B2 7/2021 Di Mondo et al.
11,192,999 B2 12/2021 Yao et al.
11,220,586 B2 1/2022 Yao et al.
11,279,811 B2 3/2022 Mondo et al.
11,319,493 B2 5/2022 Daggupati et al.
11,499,110 B2 11/2022 Celik et al.
11,518,865 B2 12/2022 Joshi et al.
11,596,935 B2 3/2023 Delferro et al.
11,613,623 B2 3/2023 Kanattukara et al.
11,780,985 B2 10/2023 Delferro et al.
11,999,920 B2 6/2024 Arnst et al.
12,031,097 B2 7/2024 Vyakaranam et al.
12,152,111 B2 11/2024 Dubois
2003/0003554 A1 1/2003 Miller et al.
2003/0032840 A1 2/2003 Sirek et al.
2003/0154885 A1 8/2003 Krendlinger et al.
2003/0195278 A1 10/2003 Forgac et al.
2003/0199718 A1 10/2003 Miller
2003/0215588 A1 11/2003 Yeager et al.
2003/0225213 A1 12/2003 Maehara et al.
2004/0071953 A1 4/2004 Sobieski
2004/0161570 A1 8/2004 Zanchetta et al.
2005/0148487 A1 7/2005 Brownscombe et al.
2005/0176866 A1 8/2005 Krendlinger et al.
2006/0084764 A1 4/2006 Hanna et al.
2006/0135713 A1 6/2006 Leclerc et al.
2007/0117894 A1 5/2007 Bach et al.
2007/0263060 A1 11/2007 Laksin et al.
2008/0119591 A1 5/2008 Falkiewicz et al.
2008/0121324 A1 5/2008 Cambon et al.
2008/0207811 A1 8/2008 Brust et al.
2009/0036619 A1 2/2009 Herrmann et al.
2009/0110925 A1 4/2009 Fukuda et al.
2009/0321317 A1 12/2009 Widmer et al.
2010/0227954 A1 9/2010 Naidoo et al.
2010/0233408 A1* 9/2010 Zickell .................... B32B 5/022 428/354
2011/0160356 A1 6/2011 Martin
2011/0195256 A1 8/2011 Morikawa et al.
2011/0196073 A1 8/2011 Fee et al.
2012/0016169 A1 1/2012 Kumar
2012/0108863 A1 5/2012 Tippet et al.
2012/0136107 A1 5/2012 Fu et al.
2012/0165455 A1 6/2012 Vitrano et al.
2012/0296036 A1 11/2012 Allen et al.
2012/0304879 A1 12/2012 Tiessen et al.
2012/0310023 A1 12/2012 Huang et al.
2013/0123396 A1 5/2013 Pochert
2013/0137794 A1 5/2013 Kasper et al.
2013/0137796 A1 5/2013 Kropp
2013/0180431 A1 7/2013 Myszak, Jr. et al.
2013/0303810 A1 11/2013 Handerek
2014/0023870 A1 1/2014 Takamori
2014/0029901 A1 1/2014 Maruyama et al.
2014/0046102 A1 2/2014 D'Amato et al.
2014/0069297 A1 3/2014 Rotz et al.
2014/0107307 A1 4/2014 Frost et al.
2014/0134533 A1 5/2014 Sacripante et al.
2014/0182194 A1 7/2014 Unger et al.
2014/0299017 A1 10/2014 Parvez et al.
2015/0018460 A1 1/2015 Guymon et al.
2015/0105494 A1* 4/2015 Naidoo ................... C08L 95/00 523/438
2015/0105496 A1 4/2015 Naidoo et al.
2015/0203731 A1 7/2015 Herrlich et al.
2015/0210611 A1 7/2015 Tippet et al.
2015/0247096 A1 9/2015 Barger et al.
2015/0322263 A1* 11/2015 Hilsenbeck ............. C08L 91/06 524/62
2015/0361374 A1 12/2015 Kumar et al.
2016/0002508 A1 1/2016 Kanderski et al.
2016/0017148 A1 1/2016 Ruan et al.
2016/0024390 A1 1/2016 Ullom
2016/0040074 A1 2/2016 Methling
2016/0053150 A1* 2/2016 Croteau ................. C09J 195/00 428/355 R
2016/0130426 A1 5/2016 Miyazaki et al.
2017/0015876 A1 1/2017 Schroeyers et al.
2017/0137717 A1 5/2017 Palmer et al.
2017/0232416 A1 8/2017 Gil et al.
2017/0283525 A1 10/2017 Li et al.
2017/0290945 A1 10/2017 Hanson et al.
2017/0306152 A1 10/2017 Shulga et al.
2018/0127522 A1 5/2018 Land et al.
2018/0208731 A1 7/2018 Vankayala
2018/0312694 A1 11/2018 Naidoo et al.
2018/0371325 A1 12/2018 Streiff et al.
2019/0062518 A1 2/2019 Jurek et al.
2019/0119191 A1* 4/2019 Streiff ...................... C10G 1/10
2019/0249088 A1 8/2019 Pour
2019/0322834 A1 10/2019 Yao et al.
2020/0172779 A1 6/2020 Di Mondo
2020/0392319 A1 12/2020 Di Mondo et al.
2021/0061971 A1 3/2021 Delferro et al.
2021/0087113 A1 3/2021 Di Mondo et al.
2021/0108154 A1 4/2021 Scheibel et al.
2022/0025151 A1 1/2022 Di Mondo et al.
2022/0089831 A1 3/2022 Kanattukara et al.
2022/0112352 A1 4/2022 Nagy et al.
2022/0177705 A1 6/2022 Almey et al.
2022/0340819 A1 10/2022 Gray et al.
2023/0313531 A1 10/2023 Balheda et al.

(56) References Cited

U.S. PATENT DOCUMENTS

| | | | |
|---|---|---|---|
| 2024/0093033 A1 | 3/2024 | Kanaujia et al. | |
| 2024/0327715 A1 | 10/2024 | Brita et al. | |

FOREIGN PATENT DOCUMENTS

| | | | |
|---|---|---|---|
| CA | 2162005 | A1 | 5/1996 |
| CA | 2202941 | A1 | 10/1998 |
| CA | 2805570 | A1 | 1/2012 |
| CA | 2812961 | A1 | 1/2012 |
| CA | 2883204 | A1 | 3/2014 |
| CA | 2898257 | A1 | 7/2014 |
| CA | 2885144 | A1 | 3/2015 |
| CA | 2890874 | A1 | 11/2015 |
| CA | 2822678 | C | 5/2017 |
| CA | 2981710 | A1 | 4/2018 |
| CA | 3036136 | A1 | 4/2018 |
| CH | 646717 | A5 | 12/1984 |
| CN | 1120347 | A | 4/1996 |
| CN | 1712465 | A | 12/2005 |
| CN | 1871190 | A | 11/2006 |
| CN | 101103066 | A | 1/2008 |
| CN | 101205390 | A | 6/2008 |
| CN | 101205396 | A | 6/2008 |
| CN | 101205402 | A | 6/2008 |
| CN | 101205407 | A | 6/2008 |
| CN | 101502993 | A | 8/2009 |
| CN | 101704932 | A | 5/2010 |
| CN | 101787102 | A | 7/2010 |
| CN | 101970095 | A | 2/2011 |
| CN | 102066525 | A | 5/2011 |
| CN | 102205220 | A | 10/2011 |
| CN | 103146267 | A | 6/2013 |
| CN | 103429675 | A | 12/2013 |
| CN | 103509496 | A | 1/2014 |
| CN | 104449090 | A | 3/2015 |
| CN | 103168016 | A | 4/2015 |
| CN | 104552735 | A | 4/2015 |
| CN | 104847921 | A | 8/2015 |
| CN | 104877699 | A | 9/2015 |
| CN | 104910511 | A | 9/2015 |
| CN | 105102519 | A | 11/2015 |
| CN | 105143326 | A | 12/2015 |
| CN | 105153511 | A | 12/2015 |
| CN | 105219406 | A | 1/2016 |
| CN | 105315391 | A | 2/2016 |
| CN | 106413876 | A | 2/2017 |
| CN | 106700975 | A | 5/2017 |
| CN | 106753057 | A | 5/2017 |
| CN | 107286277 | A | 10/2017 |
| CN | 107629565 | A | 1/2018 |
| CN | 206983219 | U | 2/2018 |
| CN | 108473808 | A | 8/2018 |
| CN | 108883551 | B | 11/2018 |
| CN | 109134979 | A | 1/2019 |
| CN | 110105474 | A | 8/2019 |
| CN | 111607171 | A | 9/2020 |
| CN | 112694552 | A | 4/2021 |
| CN | 113185626 | A | 7/2021 |
| CN | 112779045 | B | 10/2021 |
| CN | 113462175 | A | 10/2021 |
| CN | 113621189 | A | 11/2021 |
| CN | 113751051 | A | 12/2021 |
| CN | 115044219 | A | 9/2022 |
| CN | 116102742 | A | 5/2023 |
| CN | 116162287 | A | 5/2023 |
| DE | 3642273 | A1 | 4/1987 |
| DE | 19500425 | C1 | 4/1996 |
| DE | 69323125 | T2 | 8/1999 |
| DE | 10037229 | A1 | 2/2000 |
| DE | 10022666 | A1 | 11/2001 |
| DE | 102018214702 | A1 | 9/2019 |
| EP | 0577279 | A1 | 1/1994 |
| EP | 0717094 | A1 | 6/1996 |
| EP | 0577279 | B1 | 1/1999 |
| EP | 1707614 | A1 | 10/2006 |
| EP | 2161299 | A1 | 3/2010 |
| EP | 2283094 | B1 | 10/2012 |
| EP | 3397442 | A1 | 11/2018 |
| EP | 3414295 | A1 | 12/2018 |
| EP | 3441136 | A1 | 12/2020 |
| EP | 3867312 | A1 | 8/2021 |
| EP | 3950814 | A1 | 2/2022 |
| EP | 4206306 | A1 | 7/2023 |
| ES | 539973 | A0 | 4/1986 |
| GB | 569043 | A | 5/1945 |
| GB | 690623 | A | 4/1953 |
| GB | 1310260 | A | 3/1973 |
| GB | 1563440 | A | 3/1980 |
| GB | 2402397 | A | 12/2004 |
| IN | 102989338 | A | 3/2013 |
| JP | S48000661 | A | 1/1973 |
| JP | S5399290 | A | 8/1978 |
| JP | S59217777 | A | 12/1984 |
| JP | H01150857 | A | 6/1989 |
| JP | 103292305 | A | 12/1991 |
| JP | H0457887 | A | 2/1992 |
| JP | H04100807 | A | 4/1992 |
| JP | H0552849 | A | 3/1993 |
| JP | H05085964 | A | 4/1993 |
| JP | H06179877 | A | 6/1994 |
| JP | H08508520 | A | 9/1996 |
| JP | H08253601 | A | 10/1996 |
| JP | H10-501563 | A | 10/1998 |
| JP | H11302663 | A | 11/1999 |
| JP | H122000512209 | A | 9/2000 |
| JP | H132001040132 | A | 2/2001 |
| JP | H142002167466 | A | 6/2002 |
| JP | H142002224652 | A | 8/2002 |
| JP | H142002256103 | A | 9/2002 |
| JP | 2003252676 | A | 9/2003 |
| JP | H152003252676 | A | 9/2003 |
| JP | H152003292594 | A | 10/2003 |
| JP | H172005170986 | A | 6/2005 |
| JP | H172005200573 | A | 7/2005 |
| JP | H172005527672 | A | 9/2005 |
| JP | H172005298802 | A | 10/2005 |
| JP | H182006056957 | A | 3/2006 |
| JP | H182006143802 | A | 6/2006 |
| JP | 2007169531 | A | 7/2007 |
| JP | H192007169531 | A | 7/2007 |
| JP | H192007529574 | A | 10/2007 |
| JP | H202008525573 | A | 7/2008 |
| JP | H212009173874 | A | 8/2009 |
| JP | H232011126995 | A | 6/2011 |
| JP | H232011225641 | A | 10/2011 |
| JP | 2016216607 | A | 12/2016 |
| JP | H302018203877 | A | 12/2018 |
| JP | 2019508524 | A | 3/2019 |
| JP | R87834270 | B2 | 3/2026 |
| KR | 100680677 | B1 | 2/2007 |
| KR | 100899029 | B1 | 5/2009 |
| KR | 100949381 | B1 | 3/2010 |
| KR | 20110051520 | A | 5/2011 |
| KR | 101487772 | B1 * | 1/2015 ............. B32B 11/04 |
| RO | 131874 | A2 | 5/2017 |
| WO | 1989000419 | A1 | 1/1989 |
| WO | 9506684 | | 3/1995 |
| WO | 9533790 | | 12/1995 |
| WO | WO 2000027942 | A1 | 5/2000 |
| WO | WO 2002090403 | A1 | 11/2002 |
| WO | WO 2005092963 | A1 | 10/2005 |
| WO | 2006071214 | A1 | 7/2006 |
| WO | 2010023173 | A1 | 3/2010 |
| WO | 2010024700 | A1 | 3/2010 |
| WO | 2010081054 | A1 | 7/2010 |
| WO | WO 2010099963 | A1 | 9/2010 |
| WO | WO 2012007833 | A2 | 7/2011 |
| WO | WO 2014110644 | A1 | 7/2014 |
| WO | WO 2014161767 | A2 | 10/2014 |
| WO | WO 2015130545 | A1 | 9/2015 |
| WO | 2015164017 | A1 | 10/2015 |
| WO | WO 2015164331 | A1 | 10/2015 |
| WO | 2016056443 | A1 | 4/2016 |
| WO | 2017113020 | A1 | 7/2017 |

(56) References Cited

FOREIGN PATENT DOCUMENTS

| | | | | |
|---|---|---|---|---|
| WO | WO 2017136957 A1 | | 8/2017 | |
| WO | WO 2017139333 A1 | | 8/2017 | |
| WO | 2017161463 A1 | | 9/2017 | |
| WO | WO-2017167947 A1 | * | 10/2017 | ............ C07C 51/16 |
| WO | WO 2018058257 A1 | | 4/2018 | |
| WO | WO 2018158285 A1 | | 9/2018 | |
| WO | 2019041049 A1 | | 3/2019 | |
| WO | WO 2019104430 A1 | | 6/2019 | |
| WO | WO 2019195915 A1 | | 10/2019 | |
| WO | 2019227233 A1 | | 12/2019 | |
| WO | 2019227234 A1 | | 12/2019 | |
| WO | 2020118453 A1 | | 6/2020 | |
| WO | 2020130952 A1 | | 6/2020 | |
| WO | 2020198871 A1 | | 10/2020 | |
| WO | 2021035351 A1 | | 3/2021 | |
| WO | WO 2021048187 A1 | | 3/2021 | |
| WO | 2021113951 A1 | | 6/2021 | |
| WO | 2022015971 A1 | | 1/2022 | |
| WO | 2022145112 A1 | | 7/2022 | |
| WO | WO 2022167903 A1 | | 8/2022 | |
| WO | WO 2023059623 A1 | | 4/2023 | |
| WO | WO 2023088861 A1 | | 5/2023 | |
| WO | WO2023121379 A1 | | 6/2023 | |
| WO | WO 2023141665 A1 | | 7/2023 | |

OTHER PUBLICATIONS

U.S. Appl. No. 16/680,428 Office Action dated Dec. 11, 2020 "USOA20201211".
U.S. Appl. No. 17/006,903 Office Action dated Nov. 4, 2020 "USOA20201104".
AU App. No. 2017239181 Notice of Acceptance dated Nov. 30, 2020 "AUNOA20201130".
CA App. No. 3096804 Canadian Office Action dated Nov. 25, 2020 "CAOA20201125".
CN App. No. 201680082803.3 Chinese Office Action dated Oct. 22, 2020 "CNOA20201022".
EP App. No. 16880228.8 European Search Report dated Dec. 17, 2020 ESR20201217.
JP App. No. 2018-534826 Notice of Allowance dated Oct. 13, 2020 "JPNOA20201013".
JP App. No. 2018-542700 Office Action dated Nov. 24, 2020 "JPOA20201124".
Office Action dated Oct. 22, 2020 in connection with Chinese Application No. 201680082803.3.
Office Action dated Nov. 24, 2020 in connection with Japanese Application No. 2018-542700.
Canadian Office Action dated Nov. 25, 2020 issued in connection with Canadian App. No. 3096804.
Notice of Acceptance dated Nov. 30, 2020 for Australian App. No. 2017239181.
International Search Report and Written Opinion dated Nov. 30, 2020 in connection with International Application No. PCT/CA2020/051166.
Extended European Search Report dated Dec. 17, 2020 issued in connection with EP. App. No. 16880228.8.
PCT/CA2020/051166 International Preliminary Report on Patentability dated Mar. 1, 2022 "IPRP20220301".
PCT/CA2020/000141 International Preliminary Report on Patentability dated May 17, 2022 "IPRP20220517".
U.S. Appl. No. 17/006,903 Office Action dated Jun. 30, 2022 "USOA20220630".
U.S. Appl. No. 17/006,903 Office Action dated Mar. 1, 2022 "USOA20220301".
AU App. No. 2017333737 Notice of Acceptance issued Jan. 4, 2022 "AUNOA20220104".
BR App No. 11 2020 004155 6 Office Action issued on May 13, 2022 "BROA20220513".
CN App. No. 201780018293.8 Chinese Office Action dated Mar. 2, 2022 "CNOA20220302" Chinese Office Action dated Jun. 21, 2022 "CNOA20220621".
EP App. No. 17769226.6 Examination Report dated Mar. 1, 2022 "EPER20220301".
EP App. No. 19811163.5 European Search Report dated Feb. 16, 2022 "ESR20220216".
EP App. No. 19894673.3 Extended European Search Report dated Jun. 3, 2022 "ESR20220603".
JP App. No. 2019-517089 Office Action dated Apr. 5, 2022 "JPOA20220405".
MX. App. No. MX/a/2018/008117 Office Action dated Mar. 1, 2022 "MXOA20220301".
TH App. No. 1801005835 Thai Office Action dated Jun. 10, 2022 "THOA20220610".
Tongkao, Practical Technology for Modification of Plastics, China Light Industry Press, Oct. 2012, pp. 44-45 and 49-50.
Notice of Acceptance dated Jan. 4, 2022, issued in connection with Australian Application No. 2017333737.
Extended European Search Report dated Feb. 16, 2022, issued in connection with European Application No. EP 19811163.5.
Examination Report dated Mar. 1, 2022, issued in connection with European Application No. 17769226.6.
International Preliminary Report on Patentability dated Mar. 1, 2022 in connection with International Application No. PCT/CA2020/051166.
Office Action dated Mar. 2, 2022, issued in connection with Chinese Application No. 201780018293.8.
Office Action dated Apr. 5, 2022, issued in connection with Japanese Application No. 2019-517089.
International Preliminary Report on Patentability dated May 17, 2022 in connection with International Application No. PCT/CA2020/000141.
Extended European Search Report dated Jun. 3, 2022, issued in connection with European Application No. 19894673.3.
Office Action dated Jun. 21, 2022, issued in connection with Chinese Application No. 201780018293.8.
International Preliminary Report on Patentability dated Apr. 11, 2019 in connection with International Application No. PCT/CA2017/051166.
Examination Report No. 1 issued on May 1, 2019 in connection with Australian application No. 2018204945.
International Search Report and Written Opinion dated Jul. 4, 2019 in connection with International Application No. PCT/CA2019/000046.
International Search Report and Written Opinion dated Jul. 12, 2019 in connection with International Application No. PCT/CA2019/050762.
International Search Report and Written Opinion dated Jul. 26, 2019 in connection with International Application No. PCT/CA2019/050761.
Extended European Search Report dated Aug. 23, 2019 issued in connection with EP. App. No. 16880228.8.
Extended European Search Report dated Sep. 4, 2019 issued in connection with EP App. No. 17769226.6.
Notice of Acceptance for Patent Application issued on Sep. 6, 2019 in connection with Australian App. No. 2018204945.
Extended European Search Report dated Oct. 7, 2019 issued in connection with EP. App. No. 17749885.4.
Office Action issued on Jan. 13, 2020 in connection with Brazilian App. No. 11 2013 001058 4.
Canadian Office Action dated Jan. 24, 2020 issued in connection with Canadian App. No. 2898257.
Examination Report No. 1 issued on Feb. 26, 2020 in connection with Australian App. No. 2017239181.
Takuma, "Production of Aromatic Hydrocarbons by Catalytic Degradation of Polyolefins Over H-Gallosilicate", Ind. Eng. Chem. Res., 2001, pp. 1076-1082.
Sari et al. "Recycling of Polyolefin Materials", Springer Series on Polymer and Composite Materials, (2016), pp. 315-339.
SUKOREZ® SU-90, Kolon Industries (Year: 2016).
"GreenMantra Technologies Introduces Ceranovus Wax Modifiers for Improved Asphalt Roofing Production and Performance", Sep. 12, 2016 pp. 1-3, Retrieved from the Internet: URL:https://www.prnewswire.com/news-releases/greenmantratechnologies-introduces-

(56) References Cited

OTHER PUBLICATIONS ceranovus-wax-modifiers-for-improved-asphaltroofing-production-and-performance [retrieved on Nov. 18, 2021].
DiMondo "An Added Benefit (Ceranovus A115 and A125)", Jan. 12, 2017, pp. 1-9, Retrieved from the Internet: https://www.professionalroofing.net/Articles/An-added-benefit [retrieved on Nov. 18, 2021].
"GreenMantra Technologies Introduce Ceranovus Polymer Additives at IRE", Feb. 6, 2018, Retrieved from the Internet https://www.roofingcontractor.com/articles/92693-greenmantratechnologies-introduce-ceranovus-polymer-additives-at-ire [retrieved on Nov. 18, 2021].
Notice of Acceptance dated Oct. 20, 2021 for Australian App. No. 2017218908.
European Search Repori dated Oct. 20, 2021 issued in connection with European App. No. 18882986.5.
European Search Repon dated Nov. 11, 2021 issued in connection with European App. No. 16880228.8.
European Search Report dated Nov. 29, 2021 issued in connection with European App. No. 19810083.6.
PCT/IB2011/001642 International Search Report and Written Opinion dated Jan. 5, 2012 "ISR20120105" International Preliminary Report on Patentability dated Aug. 1, 2012 "IPRP20120801".
PCT/CA2013/000041 International Search Report and Written Opinion dated Sep. 20, 2013 "ISR20130920" International Preliminary Report on Patentability dated on Jul. 21, 2015 "IPRP20150721".
PCT/CA2016/051555 International Search Report and Written Opinion dated Mar. 17, 2017 "ISR20170317" International Preliminary Report on Patentability dated Jul. 12, 2018 "IPRP20180712".
PCT/CA2017/050172 International Search Report and Written Opinion dated May 2, 2017 "ISR20170502" International Preliminary Report on Patentability dated Aug. 23, 2018 "IPRP20180823".
PCT/CA2017/050378 International Search Report and Written Opinion dated Jul. 25, 2017 "ISR20170725" International Preliminary Report on Patentability dated Oct. 4, 2018 "IPRP20181004".
PCT/CA2017/051166 International Search Report and Written Opinion dated Dec. 15, 2017 "ISR20171215" International Preliminary Report on Patentability dated Apr. 11, 2019 "ISR20190411".
PCT/CA2018/051058 International Search Report and Written Opinion dated Nov. 16, 2018 "ISR20181116".
PCT/CA2018/051517 International Search Report and Written Opinion dated Feb. 5, 2019 "ISR20190205".
PCT/CA2019/000046 International Search Report and Written Opinion dated Jul. 4, 2019 "ISR20190704".
PCT/CA2019/050761 International Search Report and Written Opinion dated Jul. 26, 2019 "ISR20190726".
PCT/CA2019/050762 International Search Report and Written Opinion dated Jul. 12, 2019 "ISR20190712".
U.S. Appl. No. 12/836,594 Office Action dated Jun. 13, 2013 "USOA20130613".
U.S. Appl. No. 14/761,779 Office Action dated Feb. 13, 2017 "USOA20170213" of Notice of Allowance dated Feb. 20, 2018 "USOA20180220".
U.S. Appl. No. 15/661,818 Office Action dated Oct. 12, 2018 "USOA20181012" Office Action issued on Apr. 18, 2019 "USOA20190418".
U.S. Appl. No. 16/000,590 Office Action dated Jul. 27, 2018 "USOA20180727" Office Action dated Mar. 5, 2019 "USOA20190305" Notice of Allowance issued on Jun. 19, 2019 "USNOA20190619".
U.S. Appl. No. 16/101,430 Notice of Allowance Nov. 14, 2019 "USNOA20191114".
U.S. Appl. No. 16/576,805 Office Action dated Oct. 24, 2019 "USOA20191024".
U.S. Appl. No. 16/134,080 Office Action dated Dec. 18, 2019 "USOA20191218".
AU App. No. 2017239181 Examination Report No. 1 issued on Feb. 26, 2020 "AUOA20200226".
AU App. No. 2018204945 Examination Report No. 1 issued on May 1, 2019 "AUER20190501" Notice of Acceptance for Patent Application issued on Sep. 6, 2019. "AUNA20190906".
BR App No. 11 2013 001058 4 Office Action issued on Jan. 13, 2020 "BROA20200113".
CA App. No. 2805570. Canadian Office Action dated Oct. 5, 2016 CAOA20161005.
CA App. No. 2898257 Office Action dated Oct. 6, 2016 "CAOA20161006" Canadian Office Action dated Jan. 24, 2020 "CAOA20200124".
CN App. No. 201180034887.0 Chinese Office Action dated Apr. 4, 2014 "CNOA20140404".
CN App. No. 201510126290.9 Chinese Office Action dated Feb. 29, 2016 "CNOA20160229".
EP App. No. 10172039.9 European Search Report dated Apr. 4, 2011 "ESR0404" Extended European Search Report dated Apr. 15, 2011 "EESR0415".
EP App. No. 16880228.8 Extended European Search Report dated Aug. 23, 2019 "ESR20190823".
EP App. No. 17749885.4 Extended European Search Report dated Oct. 7, 2019 "ESR20191007".
EP App. No. 17769226.6 Extended European Search Report dated Sep. 4, 2019 "ESR20190904".
JP App. No. 2013-519172 Office Action dated Jun. 10, 2015 "JPOA20150610".
MY App. No. 2013000128 Malaysian Office Action dated Oct. 15, 2015 "MYOA20151015".
IN App. No. 316/KOLNP/2013O Indian Office Action dated Nov. 30, 2017 "INOA20171130".
Tordella et al., "Isomorphic Interactions of Ethylenic Polymers and Paraffin Wax", J. of Polymer Science, vol. 8, 1970, pp. 81-87.
Yu, Peroxide modified polyolefin blends Part 1: Effects on LDPE/PP blends with components with similar initial viscosities, Adv. Polymer Tech., vol. 10(3), 1990, pp. 163-172.
Teh, A Review of polyethylene-polypropylene blend and their compatibilization, Adv. Polymer Tech., vol. 13(1), 1994, pp. 1-23.
Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.
Ding et al., Thermal and catalytic degradation of high density polyethylene and commingled post-consumer plastic waste, Fuel Processing Technology, Mar. 1997, vol. 51, Issues 1-2, pp. 47-62.
Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.
Buekens et al., Catalytic plastics cracking for recovery of gasoline-range hydrocarbons from municipal plastic wastes, Resources, Conservation and Recycling, Aug. 1998, vol. 23, Issue 3, pp. 163-181.
Kartalis et al., Recycling of post-used PE packaging film using the restabilization technique, Poly. Degrad. And Stab., 2000, vol. 70(2), pp. 189-197.
Luo et al., Catalytic degradation of high density polyethylene and polypropylene into liquid fuel in a power- particle fluidized bed, Polymer Degradation and Stability, online, 2000, vol. 70(1), pp. 97-102.
Predel, "Pyrolysis of mixed polyolefins in a fluidised-bed reactor and on a pyro-GCMS to yield aliphatic waxes"; Polymer Degradation and Stability, 2000, vol. 70(3), pp. 373-385.
You et al., Liquid-phase catalytic degradation of polyethylene wax over silica modified zeolite catalysts, Polymer Degradation and Stability, 2001, vol. 265(2), pp. 329-336.
Seo et al., Investigation of Catalytic degradation of HDPE by hydrocarbon group type analysis, Journal of Analytical and Applied Pyrolysis, 2003, vol. 70, Issue 2, pp. 97-102.
Lai et al., Depolymerization of HDPE to wax in the presence of a catalyst formed by homonuclear macrocyclic zirconium. Complex chemically bonded to alumina support, Journal of Molecular Applied Catalysis A: General, 2006, vol. 303(1), pp. 9-17.
Lai et al., Development of heterogeneous catalyst by ionically bonding macrocyclic Zr—Zr complex to montmorillonite clay for depolymerization of polypropylene, Journal of Molecular Applied Catalysis A: Chemical, 2007, vol. 265(1-2), pp. 15-24.

(56) References Cited

OTHER PUBLICATIONS

Rosa et al., Processing and thermal, mechanical and morphological characterization of post-consumer polyolefins/thermoplastic starch blends, J. of Mat. Sci., 2007, 42(2), pp. 551-557.
Urbaniak et al. "Waxes—Products of Thermal Degradation of Waste Plastics—Obtaining, Capabilities, and Application", Archives of Waste Management and Environmental Protection, vol. 6, 2007, pp. 71-78.
Garcia et al., Recycling extruded polystyrene by dissolution with suitable solvents, J. of Mat. Cycles and Waste Management, 2009, vol. 11(1), pp. 2-5.
Aboulkas, Thermal degradation behaviors of polyethylene and polypropylene. Part 1: pyroloysis kinetics and mechanisms, Energy Conversion and Management, 2010, vol. 51, pp. 1363-1369.
Arabiourrutia, "Characterization of the waxes obtained by the pyrolysis of polyolefin plastics in a conical spouted bed reactor"; Journal of Analytical and Applied Pyrolysis, 2012, vol. 94, pp. 230-237.
Xanthos, Recycling of the #5 polymer, Science, 2012, vol. 337, pp. 700-702.
European Search Report dated Apr. 4, 2011 in connection with European Patent Application No. 10172039.9-2104.
Extended European Search Report dated Apr. 15, 2011 in connection with European Patent Application No. 10172039.9- 2104.
International Search Report and Written Opinion dated Jan. 5, 2012 in connection with International Patent Application No. PCTIB2011001642.
International Preliminary Report on Patentability dated Aug. 1, 2012, in connection with International Application No. PCTIB2011001642.
International Search Report and Written Opinion dated Sep. 20, 2013 in connection with International Application No. PCTCA2013000041.
Office Action dated Apr. 4, 2014 in connection with Chinese Application No. 201180034887.0.
Kaitz et al., "Depolymerizable polymers:preparation, applications, and future outlook", MRS Comm., 2015, vol. 5, pp. 191-204.
"SCRA Spinout Case Study—Recycling Technologies", Sep. 2015, pp. 1-3, Retrieved from the Internet: https://warwick.ac.uk/fac/crossfac/sciencecity/casestudies/recycling-technologies/ [retrieved on 2019-08-22].
Office Action dated on Jun. 16, 2015 in connection with Japanese Application No. 2013-519172.
International Preliminary Report on Patentability dated on Jul. 21, 2015 in connection with International Application PCTCA2013000041.
Office Action dated Oct. 15, 2015 in connection with Malaysian Patent Application No. 2013000128.
Office Action dated on Feb. 29, 2016 in connection with Chinese Application No. 201510126290.9.
Office Action dated on Oct. 5, 2016 in connection with Canadian Application No. 2805570.
Office Action dated on Oct. 6, 2016 in connection with Canadian Application No. 2898257.
Gergo, P. et al. "Rheological Investigation of Rubber Bitumen Containing Various Waxes as Warm Mix Additive" STUDIA UBB CHEMIA LXII, 2 Tom II, 2017 p. 247-257.
International Search Report and Written Opinion dated on Mar. 17, 2017 in connection with International PCTCA2016051555.
International Search Report and Written Opinion dated May 2, 2017 in connection with PCT/CA2017/050172.
International Search Report and Written Opinion dated Jul. 25, 2017 in connection with International Application No. PCT/CA2017/050378.
Office Action dated on Nov. 30, 2017 in connection with Indian Application No. 316/KOLNP/2013.
International Search Report & Written Opinion dated Dec. 15, 2017 in connection with International Application No. PCT/CA2017/051166.
"Changing the Story of Waste Plastic (Crowdcube presentation)", Feb. 2018, Retrieved from the Internet: https://hkstartupresources.com/wpcontent/uploads/2018/02/recycling-technologies-ltdbusiness- plan.pdf [retrieved on 2019- 08-22].
International Preliminary Report on Patentability dated Jul. 12, 2018 in connection with International Application No. PCT/CA2016/051555.
International Preliminary Report on Patentability dated Aug. 23, 2018 in connection with PCT/CA2017/050172.
International Preliminary Report on Patentability dated Oct. 4, 2018 in connection with International Application No. PCT/CA2017/050378.
International Search Report and Written Opinion dated Nov. 16, 2018 in connection with PCT/CA2018/051058.
International Search Report and Written Opinion dated Feb. 5, 2019 in connection with International application No. PCT/CA2018/051517.
Shang et al., "Pyrolyzed Wax from Recycled Cross-Linked Polyethylene as Warm Mix Asphalt (WMA) Additive for SBS Modified Asphalt", Progress in Rubber, Plastics and Recycling Technology, vol. 27, 2011, pp. 133-144.
Extended European Search Report dated May 3, 2021 issued in connection with EP. App. No. 18851118.2.
International Preliminary Report on Patentability dated March 1. 2022 in connection with International Application No. PCT/CA2020/051166.
U.S. Appl. No. 17/006,903 Office Action dated May 17, 2021 "USOA20210517".
U.S. Appl. No. 17/073,277 Office Action dated Jun. 7, 2021 "USOA20210607".
EP App. No. 18851118.2 Extended European Search Report dated May 3, 2021 "ESR20210503".
U.S. Appl. No. 17/006,903 Office Action dated Dec. 3, 2021 "USOA20211203".
2017218908 Notice of Acceptance dated Oct. 20, 2021 "AUNOA20211020".
16880228.8 European Search Report dated Nov. 11, 2021 "ESR20211111".
18882986.5 European Search Report dated Oct. 20, 2021 "ESR20211020".
19810083.6 European Search Report dated Nov. 29, 2021 "ESR20211129".
European Search Report dated Oct. 20, 2021 issued in connection with European App. No. 18882986.5.
European Search Report dated Nov. 11, 2021 issued in connection with European App. No. 16880228.8.
PCT/CA2020/000141 International Search Report and Written Opinion dated Apr. 15, 2021 "ISR20210415".
U.S. Appl. No. 16/293,792 Notice of Allowance dated Mar. 24, 2021 "USNOA20210324".
AU App. No. 2017333737 Examination Report No. 1 issued on Mar. 30, 2021 "AUER20210330".
CA App. No. 3096804 Canadian Office Action dated Apr. 20, 2021 "CAOA20210420".
CN App. No. 201780011193.2 Chinese Office Action dated Feb. 9, 2021 "CNOA20210209".
CN App. No. 201780018293.8 Chinese Office Action dated Feb. 2, 2021 "CNOA20210202".
Office Action dated on Feb. 2, 2021 in connection with Chinese Application No. 201780018293.8.
Office Action dated on Feb. 9, 2021 in connection with Chinese Application No. 201780011193.2.
Examination Report No. 1 issued on Mar. 30, 2021 in connection with Australian application No. 2017333737.
International Search Report and Written Opinion dated Apr. 15, 2021 in connection with International Application No. PCT/CA2020/000141.
Canadian Office Action dated Apr. 20, 2021 issued in connection with Canadian App. No. 3096804.
Office Action dated on Jun. 3, 2021 in connection with Chinese Application No. 201780059004.9.
Office Action dated Jul. 6, 2021 issued in connection with JP App. No. 2019-517089.
Examination Report No. 1 issued on Sep. 8, 2021 in connection with Australian application No. 2017218908.

(56) References Cited

OTHER PUBLICATIONS

European Office Action dated Oct. 5, 2021 issued in connection with European App. No. 17854306.2.
Handbook of Adhesives Technology & Application, Beijing Adhesive Society, Aerospace Press, 1991, pp. 735-736.
Oldshue, "Fluid Mixing Technology", Chem. Industry Press, 1991, p. 279.
Office Action issued on Feb. 28, 2020 in connection with Brazilian App. No. 11 2018 013600 0.
Office Action dated Mar. 2, 2020 in connection with Chinese Application No. 201680082803.3.
International Preliminary Report on Patentability dated March 3. 2020 in connection with International Application No. PCT/CA2018/051058.
International Search Report and Written Opinion dated Mar. 19, 2020 in connection with International Application No. PCT/CA2019/051814.
Partial European Search Report dated Mar. 20, 2020 in connection with European Application No. 17854306.2.
Office Action dated Apr. 28, 2020 in connection with Canadian Application No. 2898257.
Office Action dated on May 26, 2020 in connection with Japanese Application No. 2018-534826.
International Search Report and Written Opinion dated Jun. 9, 2020 in connection with International Application No. PCT/CA2020/050439.
Office Action dated on Jun. 15, 2020 in connection with Chinese Application No. 201780011193.2.
Extended European Search Report dated Jun. 20, 2020 in connection with European Application No. 17854306.2.
Office Action dated on Jun. 30, 2020 in connection with Japanese Application No. 2018-542700.
Notice of Allowance for Patent Application issued on Jul. 1, 2020 in connection with Brazilian App. No. 11 2013 001058 4.
European Search Report dated Apr. 4, 2011 in connection with European Patent Application No. 10172039.
"SCRA Spinout Case Study- Recycling Technologies", Sep. 2015, pp. 1-3, Retrieved from the Internet: https://warwick.ac.uk/fac/crossfac/sciencecity/casestudies/recycling-technologies/[retrieved on Aug. 22, 2019].
"Changing the Story of Waste Plastic (Crowdcube presentation)", Feb. 2018, Retrieved from the Internet: https://hkstartupresources.com/wpcontent/uploads/2018/02/recycling-technologies-Itdbusiness- plan.pdf [retrieved on Aug. 22, 2019].
Office Action dated Mar. 20, 2023, issued in connection with Canadian Application 3,015,859.
Office Action dated Apr. 25, 2023, issued in connection with Mexican Application No. MX/a/2018/009808.
Examination Report dated May 17, 2023, issued in connection with European Application No. 20858584.4.
Office Action dated May 19, 2023, issued in connection with Mexican Application No. MX/a/2018/011492.
Office Action dated May 23, 2023, issued in connection with Japanese Application No. 2020-566670.
Office Action dated Jul. 6, 2023, issued in connection with Chinese Application No. 201880076385.6.
U.S. Appl. No. 17/363,009 Notice of Allowance dated Aug. 9, 2023 "NOA20230809".
CN App. No. 201880076385.6. Chinese Office Action dated Jul. 6, 2023 "CNOA20230706".
Jp App. No. 2020-566670 Office Action dated May 23, 2023 "JPOA20230523".
Office Action dated Jul. 1, 2022, issued in connection with Brazilian Application No. BR 11 2018 068992 0.
Office Action dated Jul. 13, 2022, issued in connection with Brazilian Application No. BR 11 2020 010448 5.
Office Action dated Aug. 23, 2022, issued in connection with Brazilian Application No. BR 11 2020 024507 0.
Office Action dated Sep. 23, 2022, issued in connection with Brazilian Application No. BR 11 2019 006300 5.
Office Action dated Nov. 17, 2022, issued in connection with Canadian Application No. 3,013,953.
Extended European Search Report dated Nov. 21, 2022, issued in connection with European Application No. 20784475.4.
Office Action dated Oct. 24, 2022, issued in connection with Brazilian Application No. BR 11 2020 024525 9.
Examination Report dated Dec. 20, 2022, issued in connection with European Application No. 16 880 228.8.
Office Action dated Jan. 13, 2023, issued in connection with Canadian Application No. 3,129,563.
Office Action dated Feb. 6, 2023, issued in connection with Canadian Application No. 3,009,917
Extended European Search Report dated Feb. 9, 2023, issued in connection with European Application No. 22179677.4.
Shang et al., "Investigation of Recycled Polyethylene Wax to Lower the Viscosity of SBS Modified Asphalt." Petroleum Asphalt, vol. 24, Issue 1, Feb. 28, 2010, pp. 64-69.
Office Action dated Jun. 13, 2024, issued in connection with Chinese Application No. 201880056636.4.
U.S. Appl. No. 17/083,681 Office Action dated Aug. 2, 2024 "USOA20240802".
U.S. Appl. No. 17/493,162 Office Action dated Jul. 18, 2024 "USOA20240718".
U.S. Appl. No. 17/671,564 Notice of Allowance dated Sep. 11, 2024 "NOA20240911".
U.S. Appl. No. 18/346,248 Notice of Allowance dated Aug. 26, 2024 "NOA20240826".
CN App. No. 201980036433.3 Chinese Office Action dated Jun. 28, 2024 "CNOA20240628".
CN App No. 201980082937.9 Office Action dated Jun. 29, 2024 "CNOA20240629".
JP App. No. 2020-566670 Office Action dated Sep. 3, 2024 "JPOA20240903".
Office Action dated Jun. 28, 2024, issued in connection with Chinese Application No. 201980036433.3.
Office Action dated Jun. 29, 2024, issued in connection with Chinese Application No. 201980082937.9.
Office Action dated Sep. 3, 2024, issued in connection with Japanese Application No. 2020-566670.
Office Action dated May 17, 2024, issued in connection with European Application No. 17854306.2.
Office Action dated May 20, 2024, issued in connection with Chinese Application No. 201880076385.6.
Extended European Search Report dated Nov. 14, 2023, issued in connection with European Application No. 20898302.3.
Office Action dated Dec. 12, 2023, issued in connection with Japanese Application No. 2021-533652.
Examination Report dated Jan. 22, 2025, issued in connection with European Application No. 18882986.5.
Office Action dated Mar. 6, 2025, issued in connection with Chinese Application No. 201980082937.9.
Office Action dated Oct. 1, 2024, issued in connection with Japanese Application No. 2021-533652.
Partial Search Report dated Oct. 16, 2024, issued in connection with European Application No. 24167042.1.
Examiner's Report dated Nov. 12, 2024, issued in connection with Canadian Application No. 3,074,243.
Office Action dated Jan. 16, 2024, issued in connection with Japanese Application No. 2020-566670.
Extended European Search Report dated Mar. 25, 2024, issued in connection with European Application No. 23208314.7.
Xing, Yuqing, "Thermoplastic Plastics and Their Composites", Harbin Institute of Technology Press, Dec. 1990.
Office Action dated Dec. 11, 2024, issued in connection with Chinese Application No. 201880056636.4.
Office Action dated Dec. 13, 2024, issued in connection with Chinese Application No. 201880076385.6.
Office Action dated Jan. 7, 2025, issued in connection with Canadian Application No. 3,121,281.
Extended European Search Report dated Jan. 14, 2025, issued in connection with European Application No. 24167042.1.
Office Action dated Jan. 16, 2025, issued in connection with European Application No. 23208314.7.

(56) References Cited

OTHER PUBLICATIONS

Office Action dated Jan. 24, 2025, issued in connection with Chinese Application No. 201980036433.3.
Office Action dated Feb. 10, 2025, issued in connection with Canadian Application No. 3,083,380.
U.S. Appl. No. 17/083,681 Office Action dated Dec. 18, 2023 "USOA20231218".
U.S. Appl. No. 17/128,992 Notice of Allowance dated Jan. 4, 2024 "NOA20240104".
BR App No. 11 2020 004155 6 Office Action issued on Oct. 20, 2023 "BROA20231020".
EP App. No. 20898302.3 European Search Report dated Nov. 14, 2023 "ESR20231114".
JP App. No. 2021-533652 Office Action dated Dec. 12, 2023 "JPOA20231212".
MX App. No. MX/a/2018/009808 Office Action dated Sep. 7, 2023 "MXOA20230907".
MX App. No. MX/a/2019/003575 Office Action dated Dec. 1, 2023 "MXOA20231201".
Mpanza et al., "Influence of Different Waxes on the Physical Properties of Linear Low-density Polyethylene", South Africa J. of Chem., vol. 59, 2006, pp. 48-54.
Farahanchi et al., Effects of ultrahigh speed twin screw extrusion on the thermal and mechanical degradation of polystyrene, Polymer Engineering, 2016, vol. 6(7), pp. 743-751.
U.S. Appl. No. 16/840,414 Office Action dated May 3, 2024 "USOA20240503".
U.S. Appl. No. 17/347,154 Office Action dated Jul. 5, 2024 "USOA20240705".
U.S. Appl. No. 17/543,733 Office Action dated May 2, 2024 "USOA20240502".
U.S. Appl. No. 18/091,345 Office Action dated May 29, 2024 "USOA20240529".
CN App. No. 201880076385.6 Chinese Office Action dated May 20, 2024 "CNOA20240520".
CN App. No. 201880056636.4 Chinese Office Action dated Jun. 13, 2024 "CNOA20240613".
EP App. No. 17854306.2 Office Action dated May 17, 2024 "EOA20240517".
MX App. No. MX/a/2019/003575 Office Action issued Apr. 16, 2024 "MXOA20240416".
Requena et al. "Encapsulation of Leu-Enkephalin in core- shell isobutylcyanoacrylate-thiolated chitosan nanoparticles for oral administration", J. Chilean Chem. Soc., 2008, vol. 53(4), pp. 1677-1681.
Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.
Office Action issued Apr. 16, 2024, issued in connection with Mexican Application No. MX/a/2019/003575.
Examination Report dated Mar. 5, 2024, issued in connection with European Application No. 18851118.2.
Rejection Decision dated Jun. 23, 2025, issued in connection with Chinese Application No. 201880076385.6.
Office Action dated Jun. 30, 2025, issued in connection with Chinese Application No. 201880056636.4.
Examination Report dated Jul. 18, 2025, issued in connection with European Application No. 19811163.5.
Rejection decision dated Aug. 4, 2025, issued in connection with Chinese Application No. 201980082937.9.
Office Action dated Aug. 5, 2025, issued in connection with Mexican Application No. MX/a/2020/005399.
Examiner's Report dated Sep. 4, 2025, issued in connection with Canadian Application No. 3,055,974.
Voinova, et al., "Microbial Polymers as a Degradable Carrier for Pesticide Delivery", 2009, vol. 45, No. 4, pp. 384-388.
Kalivoda et al., "Application of Mixtures of Polymeric Carriers for Dissolution Enhancement of Fenofibrate Using Hot-Melt Extrusion", International Journal of Pharmaceutics Vo. 429, Mar. 6, 2012, 58-68.
Kalivoda, et al., "Application of Mixtures of Polymeric Carriers for Dissolution of Enhancement of Oxeglitazar Using Hot-Melt Extrusion", International Journal of Pharmaceutics, vol. 439, Oct. 8, 2012, 145-156.
Lee, et al., "Self Healing Behavior for Crack Closing of Expansive Agent Via Granulation/film Coating Methods", Construction and Building Materials, vol. 71, August 23, 2014, 188-193.
Decision of Final Rejection dated Jan. 6, 2026, issued in connection with Japanese Application No. 2012-533652.
Examination Report dated Jan. 15, 2026, issued in connection with Canadian Application No. 3,163,119.
Rejection decision dated Feb. 4, 2026, issued in connection with Chinese Application No. 201880056636.4.
Office Action dated Mar. 4, 2026, issued in connection with Mexican Application No. MX/a/2020/005399.
Examination Report dated Mar. 13, 2026, issued in connection with Canadian Application No. 3,151,493.
NIOSH, "Asphalt Fume Exposures During the Application of Hot Asphalt to Roofs", DHHS (NIOSH) Publication No. 2003-112, Jun. 2003.
Office Action dated Apr. 1, 2025, issued in connection with Japanese Application No. 2021-533652.
Examiner's Report dated May 6, 2025, issued in connection with Canadian Application No. 3,135,868.
Reexamination Notification dated May 16, 2025, issued in connection with Chinese Application No. 201780018293.8.
Examiner's Report dated Jun. 10, 2025, issued in connection with Canadian Application No. 3,229,291.
Examiner's Report dated Jun. 13, 2025, issued in connection with Canadian Application No. 3,101,676.
Xinyuan, "Polymer Materials Processing Principle", China Textiles Press, Jul. 2000, pp. 84-85.
Shang et al., "An Exploration of Recycling Polyethylene Wax to Reduce Viscosity and Modify SBS Asphalt." Petroleum Asphalt, vol. 24, Issue 1, Feb. 28, 2010, pp. 64-69.
Lijiu, "New Roofing Materials", China Building Materials Industry Press, Oct. 2012, in pp. 30-33.
Changming, "Plastic Application Technology Manual", Mechanical Industry Press, May 2013, pp. 287-288.
Office Action dated Sep. 7, 2023, issued in connection with Mexican Application No. MX/a/2018/009808.
Office Action dated Oct. 20, 2023, issued in connection with Brazilian Application No. BR 112020004155-6.
Office Action dated Dec. 1, 2023, issued in connection with MX/a/2019/003575.
Office Action dated Jan. 16, 2025, issued in connection with Mexican Application No. MX/a/2020/005399.
Office Action dated Oct. 23, 2025, issued in connection with Mexican Application No. MX/a/2021/012142.
Examiner's Report dated Oct. 28, 2025, issued in connection with European Application No. 19894673.3.
Rejection decision dated Nov. 12, 2025, issued in connection with Chinese Application No. 201980036433.3.
Reexamination Review Decision dated Nov. 25, 2025, issued in connection with Chinese Application No. 201780018293.8.
Office Action dated Nov. 25, 2025, issued in connection with Japanese Application No. 2025-001990.
Examiner's Report dated Nov. 27, 2025, issued in connection with Canadian Application No. 3,083,380.
Extended European Search Report dated Nov. 27, 2025, issued in connection with European Application No. 25186356.9.
Examiner's Report dated Dec. 29, 2025, issued in connection with Canadian Application No. 3,254,259.
Examination Report dated Jan. 5, 2026, issued in connection with European Application No. 20858584.4.
Office Action dated Mar. 19, 2026, issued in connection with Mexican Application Mx/a/2021/012142.
U.S. Appl. No. 16/840,414 Office Action dated Aug. 22, 2023 "USOA20230822".
U.S. Appl. No. 17/543,733 Office Action dated Aug. 31, 2023 "USOA20230831".
U.S. Appl. No. 17/671,564 Office Action dated Aug. 17, 2023 "USOA20230817".

(56) References Cited

OTHER PUBLICATIONS

U.S. Appl. No. 18/091,345 Office Action dated Sep. 29, 2023 "USOA20230929".
BR App No. 11 2020 024507 0 Office Action published on Aug. 15, 2023 "BROA20230815".
BR App. No. 11 2021 019925 0. Office Action issued on Sep. 13, 2023 "BROA20230913".
CA App. No. 3013953 Canadian Office Action dated Aug. 16, 2023 "CAOA20230816".
CN App. No. 201980043504.2 Chinese Office Action dated Sep. 4, 2023 "CNOA20230904".
EP App. No. 20858584.4 Extended European Search Report dated Aug. 24, 2023 "ESR20230824".
MX App. No. MX/a/2018/011492 Office Action dated Sep. 27, 2023 "MXOA20230927".
Halley et al., "Chemorheology of Polymers—From Fundamental Principles to Reactive Processing", Cambridge University Press, 2009, pp. 1-168.
Simnofske, D. et al. "Benefits of F-T Wax Based Warm Asphalt Mixes for Short-Term Binder Aging and Pavement Durability", Jun. 1, 2016, Proceedings of 6th Eurasphalt & Europbitume Congress.
"GreenMantra Technologies Introduces Ceranovus Wax Modifiers for Improved Asphalt Roofing Production and Performance", Sep. 12, 2016 pp. 1-3, Retrieved from the Internet:https://www.prnewswire.com/news-releases/greenmantratechnologies-introduces-ceranovus-wax-modifiers-for-improved-asphaltroofing-production-and-performance [retrieved on Nov. 18, 2021].
Ferraz et al., "Polystyrene recycling processes by dissolution in ethyl acetate", Journal of Applied Polymer Science, 2018.
Perez, Ignacio et al., "Use of Lignin Biopolymer From Industrial Waste as Bitumen Extender for Asphalt Mixtures", Journal of Cleaner Production, vol. 220, pp. 87-98, XP085643290, ISSN: 0959-6526, DOI: 10.1016/J.JCEPRO.2019.02.08.
White, "Laboratory Evaluation of Asphalt Containing Recycled Plastic as a Bitumen Extended and Modifier", Oct. 28, 2019, Journal of Traffic and Transportation Engineering, vol. 7, No. 5, retrieved from the internet: https://www.researchgate.net/profile/Greg-White/publication/337210894_Laboratory_Evaluation_of_Asphalt_Containing_Recycled_Plastic_as_a_Bitumen_Extender_and_Modifier.pdf.
Office Action published Aug. 15, 2023, issued in connection with Brazilian Application No. BR 11 2020 024507 0.
Office Action dated Aug. 16, 2023, issued in connection with Canadian Application No. 3,013,953.
Extended European Search Report dated Aug. 24, 2023, issued in connection with European Application No. 20858584.4.
Office Action dated Sep. 4, 2023, issued in connection with Chinese Application No. 201980043504.2.
Office Action dated Sep. 13, 2023, issued in connection with Brazilian Application No. BR 11 2021 019925 0.
Office Action dated Sep. 27, 2023, issued in connection with Mexican Application No. MX/a/2018/011492.
Examination Report dated Sep. 9, 2026, issued in connection with European Application No. 18851118.2.
Examination Report dated Jun. 24, 2026, issued in connection with European Application No. 20784475.4.
Office Action dated Jul. 8, 2026, issued in connection with Mexican Application No. MX/a/2023/014309.
Examination Report dated Aug. 3, 2026, issued in connection with European Application No. 20898302.3.
Office Action dated Sep. 2, 2026, issued in connection with Chinese Application No. 202110634558.5.
Examination Report dated Aug. 27, 2026, issued in connection with European Application No. 22179677.4.

* cited by examiner

MODIFICATION OF ASPHALT ADHESIVES WITH WAXES

CROSS-REFERENCE TO RELATED APPLICATIONS

This application is a continuation of and claims priority benefit from International Application No. PCT/CA2018/051058 filed on Aug. 31, 2018, entitled "Modification Of Asphalt Adhesives With Waxes" which, in turn, claims priority benefit from application claims priority benefit from U.S. Application Ser. No. 62/553,357 filed on Sep. 1, 2017 also entitled, "Modification of Asphalt Adhesives with Waxes". The '058 and '357 applications are hereby incorporated by reference herein in their entireties.

FIELD OF THE INVENTION

The present invention relates to a method of employing waxes as additives in asphalt formulations used in asphalt adhesive products, such as peel-and-stick sheets, or ice and water shields.

Peel-and-stick sheets/mats are often used as a waterproof roofing underlayment, tile underlayment, and/or to protect foundations from water seepage.

When used as a roofing underlayment, the sheets are applied to the deck of a roof before the shingles to shield the deck fronom moisture, both before and after shingle installation. In at least some embodiments, the peel-and-stick sheets adhere directly to the plywood, or other material, that forms the structural portion of the roof. Often, when applied, the sheets smooth the outline of deck panels caused by irregularities in the deck surface that can be visible through the shingles. In addition, the sheets can help prevent flaming of the underside of the deck. One major component in peel-and-stick sheets is asphalt. Peel-and-stick sheets often are limited to the properties of the asphalt used.

Waxes can be employed to modify asphalt. Waxes are compatible with a wide variety of asphalt additives and can be combined with a variety of materials commonly employed to improve the quality of asphalts. However, the use of synthetic waxes designed from plastics to improve the physical properties, processability, and/or compatibility/stability of asphalt adhesive formulations has not yet been done.

There have been efforts to convert plastic feedstocks including solid wastes into useful products. One such process to form useful waxes from solid wastes is discussed in U.S. Pat. No. 8,664,458 "Kumar" which is hereby incorporated by reference herein in its entirety.

A method of employing waxes produced from thermal degradation and/or catalytic depolymerization of plastic feedstock to improve processing of and/or confer more desirable physical characteristics to asphalt adhesive formulations would be commercially advantageous. In some embodiments, such asphalt adhesive formulations can be used in peel-and-stick sheets and other asphalt applications.

SUMMARY OF THE INVENTION

A peel-and-stick sheet can comprise a top layer; a top compound layer containing a first asphalt formulation; a fiberglass mat layer; a bottom compound layer; and a plastic release film layer. In some embodiments, the top layer is a plastic film. In some embodiments, the top layer is made of a granulated material.

In certain embodiments, the first asphalt formulation contains a first wax. In some embodiments, the first wax is made by catalytic depolymerization of a polymeric material. In some embodiments, the first wax is made by thermally degrading a polymeric material.

In certain embodiments, the polymeric material is polypropylene. In some embodiments, the polymeric material is polyethylene. In some embodiments, the polymeric material is a mixture of polyethylene and polypropylene. In at least some embodiments, the polymeric material comprises recycled plastics.

In some embodiments, the bottom compound layer comprises a second asphalt formulation.

In some embodiments, the first asphalt formulation and the second asphalt formulation are the same.

In some embodiments, a peel-and-stick sheet can be created by adding a layer of asphalt, containing a wax made from depolymerized plastic feedstock, to the sheet.

DETAILED DESCRIPTION OF ILLUSTRATIVE EMBODIMENT(S)

Figure 1:
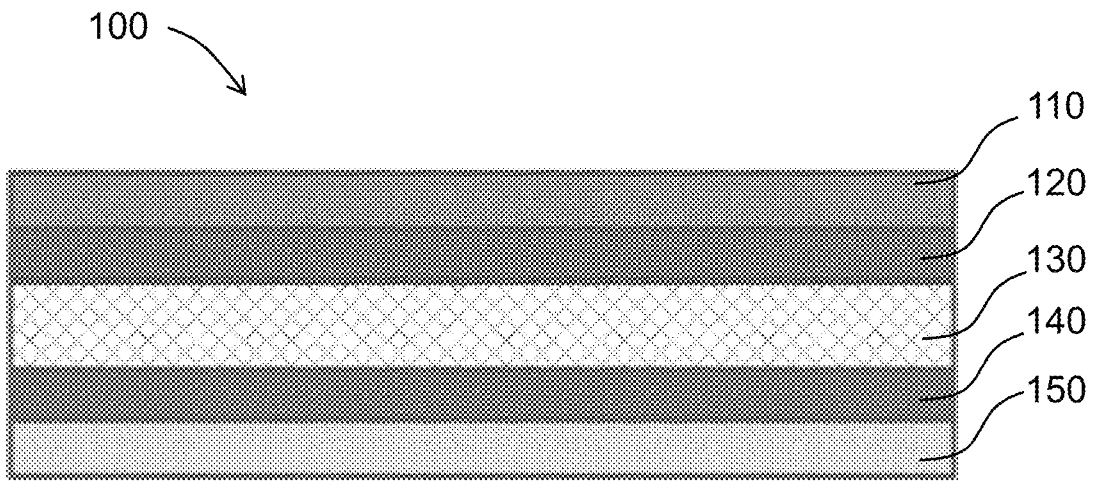
FIG. 1 is a side view of peel-and-stick sheet.

FIG. 1 is a side view of peel-and-stick sheet 100. In at least some embodiments, peel-and-stick sheet 100 can include top layer 110, top compound layer 120, fiberglass mat layer 130, bottom compound layer 140, and/or plastic release film layer 150.

In some embodiments, top layer 110 can be a plastic film. In some embodiments, top layer 110 can be a granulated material.

In at least some embodiments, top compound layer 120 can have an elastic modulus in compliance with the thermal and shear resistance requirements of ASTM D1970. In at least some embodiments, top compound layer 120 can be an asphalt. In some embodiments, top compound layer 120 can be modified with a wax.

In some embodiments, the wax can be made by catalytic depolymerization of polymeric material. In some embodiments, the wax can be made by thermally degrading polymeric material. In some embodiments, the polymeric material can be polyethylene. In some embodiments, the polymeric material can be polypropylene. In some embodiments, the polymeric material can be polypropylene (PP), high density polyethylene (HDPE), low density polyethylene (LDPE), linear low density polyethylene (LLDPE), or other variations of polyethylene.

In some embodiments, the polymeric material can include both polyethylene and polypropylene material. In some embodiments, the polymeric material can be divided evenly by weight between polyethylene and polypropylene. In some embodiments, the polymeric material can include lower levels of polystyrene, polyethylene terephthalate (PET), ethylene-vinyl acetate (EVA), (polyvinyl chloride) PVC, (ethylene vinyl alcohol) EVOH, and/or undesirable additives and/or contaminants, such as fillers, dyes, metals, various organic and inorganic additives, moisture, food waste, dirt, or other contaminating particles.

In some embodiments, the polymeric material can include combinations of LDPE, LLDPE, HDPE, and PP.

In some embodiments, the polymeric material comprises recycled plastics. In some embodiments, the polymeric material comprises virgin plastics. In other or the same embodiments, the polymeric material comprises recycled plastics and/or virgin plastics.

In some embodiments, the polymeric material can include waste polymeric material feed. Suitable waste polymeric material feeds can include, but are not limited to, mixed polyethylene waste, mixed polypropylene waste, and/or a mixture including mixed polyethylene waste and mixed polypropylene waste. The mixed polyethylene waste can include LDPE, LLDPE, HDPE, PP, and/or a mixture including combinations of LDPE, LLDPE, HDPE and PP. In some embodiments, the mixed polyethylene waste can include film bags, milk jugs or pouches, totes, pails, caps, agricultural film, and/or packaging material. In some embodiments, the waste polymeric material feed can include up to 10% by weight of material that is other than polymeric material, based on the total weight of the waste polymeric material feed.

In some embodiments, the polymeric material can be one of, or a combination of, virgin polyethylene (any one of, or combinations of, HDPE, LDPE, LLDPE and medium-density polyethylene (MDPE)), virgin polypropylene, and/or post-consumer or post-industrial polyethylene or polypropylene. Examples of post-consumer or post-industrial sources of polyethylene and polypropylene can include, but are not limited to, bags, jugs, bottles, pails, and/or other items containing PE or PP.

In at least some embodiments, bottom compound layer 140 can be modified. In at least some embodiments, bottom compound layer 140 can be an asphalt. In at least some embodiments, bottom compound layer 140 can function as the adhesive layer for the sheets. In at least some embodiments, bottom compound layer 140 can be formulated to firmly adhere to a variety of roofing decks. In at least some embodiments, the roofing deck is made of plywood. In at least some embodiments, the adhesive properties of bottom compound layer 140 can remain functional for months to allow for manufacture, warehousing, logistics and job-site storage prior to application. In at least some embodiments, the adhesive properties of bottom compound layer 140 can remain functional for at least six months after application.

In some embodiments, bottom compound layer 140 can be modified with a wax.

In some embodiments, top compound layer 120 can be modified with a wax. In some embodiments, top compound layer 120 is the same compound as bottom compound layer 140.

In some embodiments, the wax can be made by depolymerizing and/or thermally degrading polymeric material. In some embodiments, the polymeric material can include polyethylene. The polymeric material can be HDPE, LDPE, LLDPE, or other variations of polyethylene.

In other embodiments, the polymeric material can include polypropylene material. In other embodiments, the polymeric material can include both polyethylene and polypropylene material. In some embodiments, the polymeric material can contain up to 20% PP, lower levels of polystyrene, PET, EVA, PVC, EVOH, and/or undesirable additives and/or contaminants, such as fillers, dyes, metals, various organic and inorganic additives, moisture, food waste, dirt, or other contaminating particles.

In other embodiments, the polymeric material can include combinations of LDPE, LLDPE, HDPE, and PP.

In some embodiments, the polymeric material comprises recycled plastics. In other or the same embodiments, the polymeric material comprises recycled plastics and/or virgin plastics.

In some embodiments, the polymeric material can include waste polymeric material feed. Suitable waste polymeric material feed can include mixed polyethylene waste, mixed polypropylene waste, and/or a mixture including mixed polyethylene waste and mixed polypropylene waste. The mixed polyethylene waste can include LDPE, LLDPE, HDPE, PP, or a mixture including combinations of LDPE, LLDPE, HDPE and PP. In some embodiments, the mixed polyethylene waste can include film bags, milk jugs or pouches, totes, pails, caps, agricultural film, and packaging material. In some embodiments, the waste polymeric material feed includes up to 10% by weight of material that is other than polymeric material, based on the total weight of the waste polymeric material feed.

In some embodiments, the polymeric material can be one of, or a combination of, virgin polyethylene (any one of, or combinations of, HDPE, LDPE, LLDPE and medium-density polyethylene (MDPE)), virgin polypropylene, or post-consumer and/or post-industrial, polyethylene or polypropylene including, but not limited to bags, jugs, bottles, pails, and/or other items containing PE or PP.

In some embodiments, the addition of the wax can change the physical characteristics of the asphalt and the resulting sheets, including:

- reducing the separation of liquid asphalt components when stored without agitation (with or without filler present);
- increasing the adhesion strength to plywood;
- increasing the softening point of asphalt;
- stiffening the asphalt;
- reducing the asphalt viscosity;
- maintaining the low temperature flexibility of peel-and-stick sheets; and
- maintaining thermal stability of peel-and-stick sheets.

In some embodiments, the percentage of wax in the wax/asphalt/filler/SBS/cross-linking agent compound is roughly 0-15% percent by weight.

The above method can employ a variety of waxes, including those with melt points between and inclusive of 60-170° C., and viscosities between and inclusive of 5-3000 cps. In some preferred embodiments, the wax(es) employed can have melt points between, and inclusive of, 115-170° C. and/or viscosities between, and inclusive of, 15-1000 cps.

Changes in melting point, viscosity, molecular weight, and/or polymer backbone structure of the wax can change the properties of the asphalt mixture.

Effect of Two Different Waxes on Selected Properties of Asphalt Mixture Used for Peel-and-Stick Sheet As set forth in Table 1 and 2 below, Control Formulation consisted of 90% by weight of Base Asphalt (PRI Stock: Mid Continent) and 10% by weight of SBS (Kraton D1101).

TABLE 1

| Sample Data Components | | |
|---|---|---|
| Ingredient | Grade/Type | Source |
| Base Asphalt | PG 64-22 | PRI Stock |
| Asphalt Extender/Flux | Eco-Addz | Kleen Performance Products |
| SBS (styrene-butadiene-styrene) | 3520 | LCY |
| Cross Linking Agent | Sulfur | PRI Stock |
| Dolomite Filler | #80 mesh (dried) | PRI Stock |
| Polyethylene Wax | Ceranovus A120 | GreenMantra (Applicant) |
| Polypropylene Wax | Ceranovus A155 | GreenMantra (Applicant) |

The preparation of the four blends for testing in this example was as follows: first 75% by weight of base asphalt (PG 64-22) was mixed with 25% by weight of flux (Eco-Addz) to create an asphalt blend.

This blend was then mixed with various components including SBS, a cross linking agent (sulfur), a filler (#80 mesh), and/or various waxes (Ceranovus A120 and Ceranovus A155). The components of the formulations were mixed in the following order, asphalt blend, SBS, sulfur, wax (if any), and then filler. Data was taken after the addition of the sulfur, again after the addition of the wax, and again after the addition of the filler.

The softening point of the formulations were determined using method D36, the penetration of the formulations were determined using method D5, the viscosity of the formulations were determined using method D4402, the separation of the formulations were determined using method D7173, the thickness of the formulations were determined using method D5147, the flexibility of the formulations were determined using method D1970-7.6, the thermal stability of the formulations were determined using method D1970-7.5, and the adhesion to plywood of the formulations were determined using method D1970-7.4 according to the ASTM standards.

As set forth in Table 2 below, Control Formulation consisted of 72.5% by weight of Asphalt Blend; 7.5% by weight of SBS; 0.188% by weight of sulfur; and 20% by weight of filler.

Wax Blend Formulation 1 consisted of 72.5% by weight of Asphalt Blend; 5.5% by weight of SBS; 0.138% by weight of sulfur; 2% by weight of Ceranovus A120; and 20% by weight of filler.

Wax Blend Formulation 2 consisted of 72.5% by weight of Asphalt Blend; 5.5% by weight of SBS; 0.138% by weight of sulfur; 2% by weight of Ceranovus A155; and 20% by weight of filler.

Wax Blend Formulation 3 consisted of 70.5% by weight of Asphalt Blend; 7.5% by weight of SBS; 0.138% by weight of sulfur; 2% by weight of Ceranovus A155; and 20% by weight of filler.

TABLE 2

| Sample Data Formulations | | | | | |
|---|---|---|---|---|---|
| | | Formulation | | | |
| | | Control | Wax Blend 1 | Wax Blend 2 | Wax Blend 3 |
| Component % total wgt | Asphalt Blend | 72.5 | 72.5 | 72.5 | 70.5 |
| | SBS | 7.5 | 5.5 | 5.5 | 7.5 |
| | Sulfur | 0.188 | 0.138 | 0.138 | 0.188 |
| | Ceranovus A120 | 0 | 2 | 0 | 0 |
| | Ceranovus A155 | 0 | 0 | 2 | 2 |
| | Filler | 20 | 20 | 20 | 20 |

TABLE 2-continued

TABLE 3

| Properties After Addition of Sulphur & Before Addition of Wax and Filler | | | | | |
|---|---|---|---|---|---|
| | | Formulation | | | |
| | | Control | Wax Blend 1 | Wax Blend 2 | Wax Blend 3 |
| Properties | Softening Point (° C.) | 102.2 | 89.4 | 90.6 | 101.7 |
| | Penetration at 25° C. (dmm) | 138 | 146 | 140 | 130 |
| | Viscosity at 170° C. (cPs) | 2020 | 660 | 800 | 2060 |
| | Viscosity at 190° C. (cPs) | 850 | 324 | 318 | 860 |
| | Separation of Top ⅓ via Softening Point (° C.) | 109.8 | 102.2 | 100.2 | 107.5 |
| | Separation of Bottom ⅓ via Softening Point (° C.) | 88.1 | 79.4 | 79.4 | 87.2 |
| | Difference between Separation of Bottom and Top Thirds (° C.) | 21.7 | 22.8 | 20.8 | 20.3 |

TABLE 4

| Properties After Addition of Sulphur and Wax & Before Addition of Filler | | | | | |
|---|---|---|---|---|---|
| | | Formulation | | | |
| | | Control | Wax Blend 1 | Wax Blend 2 | Wax Blend 3 |
| Properties | Softening Point (° C.) | 102.2 | 92.2 | 106.9 | 117.7 |
| | Penetration at 25° C. (dmm) | 138 | 121 | 102 | 99 |
| | Viscosity at 170° C. (cPs) | 2020 | 1080 | 970 | 2125 |
| | Viscosity at 190° C. (cPs) | 850 | 485 | 450 | 970 |
| | Separation of Top ⅓ via Softening Point (° C.) | 109.8 | 104.8 | 109.1 | 115.5 |
| | Separation of Bottom ⅓ via Softening ) Point (° C. | 88.1 | 80.9 | 115.2 | 123.2 |

TABLE 4-continued

Properties After Addition of Sulphur and Wax & Before Addition of Filler

| | Formulation | | | |
|---|---|---|---|---|
| | Control | Wax Blend 1 | Wax Blend 2 | Wax Blend 3 |
| Difference between Separation of Bottom and Top Thirds (° C.) | 21.7 | 23.9 | 6.1 | 7.7 |

TABLE 5

Properties After Addition of Sulphur, Wax and Filler

| | | Formulation | | | |
|---|---|---|---|---|---|
| | | Control | Wax Blend 1 | Wax Blend 2 | Wax Blend 3 |
| Properties | Softening Point (° C.) | 98.9 | 93.3 | 108.3 | 119.8 |
| | Penetration at 25° C. (dmm) | 103 | 111 | 93 | 89 |
| | Viscosity at 170° C. (cPs) | 3875 | 1625 | 1270 | 2900 |
| | Viscosity at 190° C. (cPs) | 1160 | 540 | 560 | 1290 |
| | Separation of Top ⅓ via Softening Point (° C.) | 111.2 | 104.8 | 112.9 | 117.2 |
| | Separation of Bottom ⅓ via Softening Point (° C.) | 130.7 | 83.6 | 124.7 | 139.5 |
| | Difference between Separation of Bottom and Top Thirds (° C.) | 19.5 | 21.2 | 11.8 | 22.3 |
| | Thickness at 25° C. (mm) | 1.264 | 1.520 | 1.348 | 1.358 |
| | Flexibility at −28.9° C. | Pass | Pass | Pass | Pass |
| | Thermal Stability at 70 +/− 1.1° C. | Pass | Pass | Pass | Pass |
| | Adhesion to Plywood at 4.4° C. Mean Force (lbf) | 3.54 | 9.51 | 10.89 | 7.07 |
| | Adhesion to Plywood at 4.4° C. Standard Deviation (lbf) | 0.45 | 1.51 | 1.21 | 3.22 |
| | Adhesion to Plywood at 23.9° C. Mean Force (lbf) | 6.10 | 7.51 | 8.30 | 4.68 |
| | Adhesion to Plywood at 23.9° C. Standard Deviation (lbf) | 2.30 | 1.18 | 0.08 | 1.93 |

The following conclusions can be drawn from the above test results: additions of waxes made from either the thermal or catalytic degradation of PP and PE virgin or waste plastics to an asphalt adhesive formulation, such as a peel-and-stick formulation (either in addition to or to offset SBS rubber) provide the following benefits:

- reducing the separation of liquid asphalt components when stored without agitation (with or without filler present);
- increasing the adhesion strength to plywood;
- increasing the softening point of asphalt;
- stiffening the asphalt;
- reducing the asphalt viscosity;
- maintaining the low temperature flexibility of peel-and-stick sheets; and
- maintaining the high temperature stability of peel-and-stick sheets.

More specifically, the addition of Ceranovus A120 (Wax Blend Formulation 1) increased adhesion to plywood by 23% at 23.9° C. and by 169% at 4.4° C. compared to the Control Formulation. Similarly, the addition of Ceranovus A155 (Wax Blend Formulation 2) increased adhesion to plywood by 36% at 23.9° C. and by 208% at 4.4° C. compared to the Control Formulation. This demonstrates that the addition of Ceranovus A120 or A155 improves the ability of the asphalt adhesive to adhere to plywood.

The addition of Ceranovus A120 and Ceranovus A155 improved viscosity by approximately 55-65%. This lower viscosity improves and facilitates production processes.

The softening point of the unfilled (Table 4) and filled (Table 5) formulations remained in the High Temperature (HT) compound range of most commercial products, (in the 200° F. range). The addition of Ceranovus A155 further improved (increased) the softening points.

The addition of Ceranovus A155 unexpectedly exhibited improved unfilled separation values (Table 4). Specifically, it is possible the Ceranovus A155 is acting as a compatibilizer. This is unexpected as a lower viscosity typically enhances tendencies to separate.

When Ceranovus A155 was added to the formulation without substitution of SBS, an improvement (increased) to the softening point and improvement to the (decreased) viscosity of the formulation while maintaining D1970's flexibility requirement was demonstrated. However, it's adhesion to plywood at 25° C. was reduced by 23%.

Figure 2:
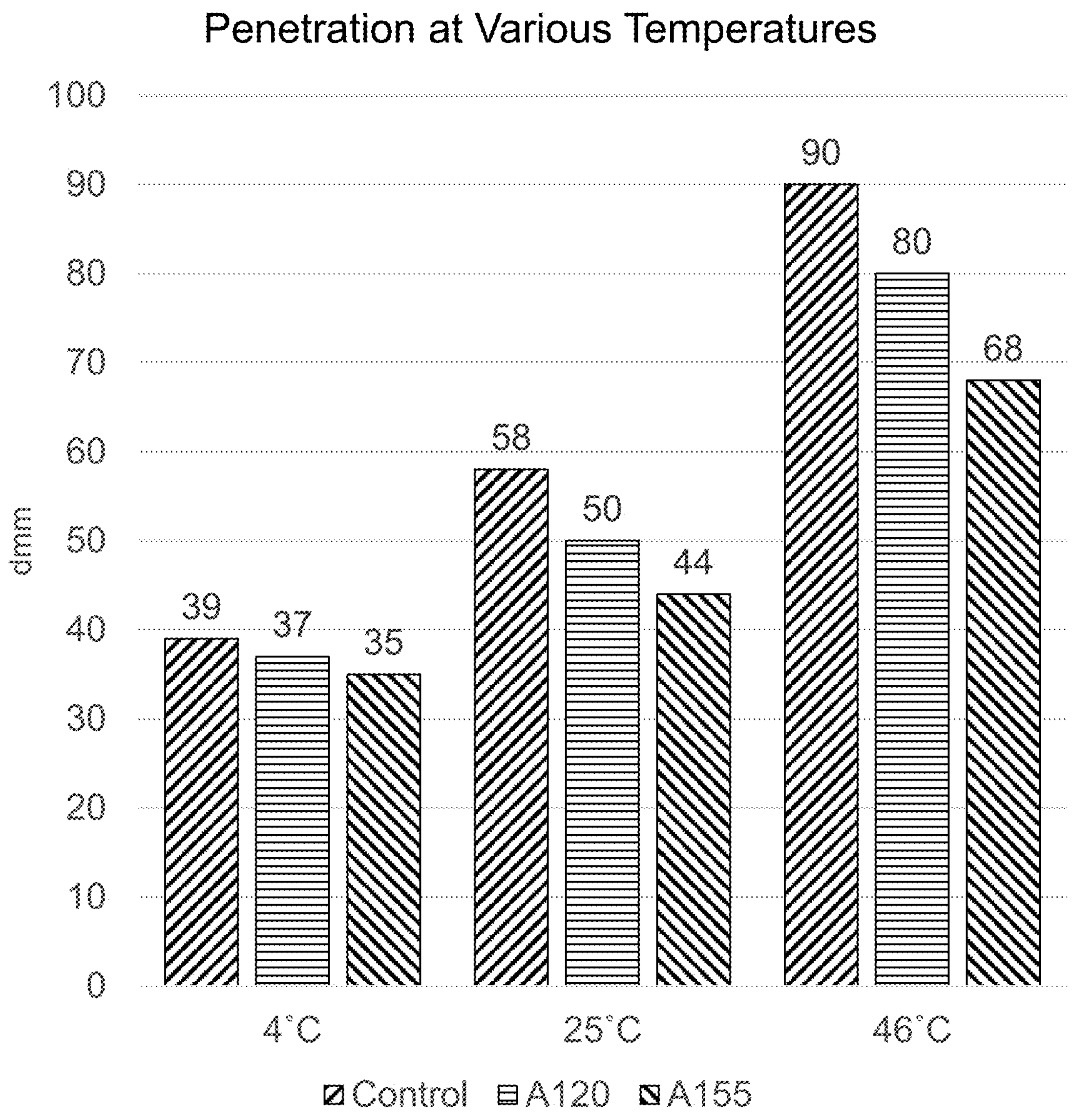
FIG. 2 is a bar graph illustrating the penetration depth of various asphalt formulations at various temperatures.

FIG. 2 is a bar graph illustrating the penetration depth of various asphalt formulations at various temperatures. Penetration was measured according to ASTM D5 standards.

Figure 3:
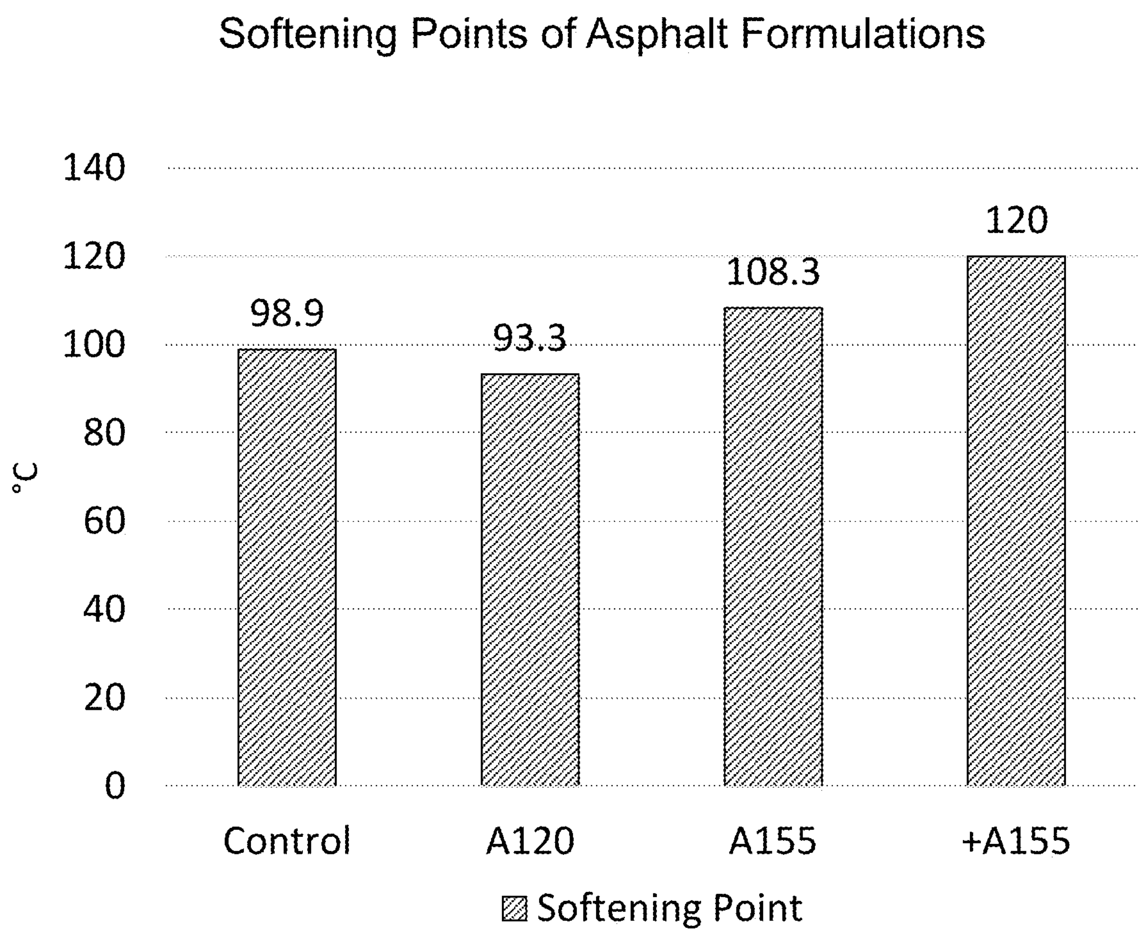
FIG. 3 is a bar graph illustrating the softening point of various asphalt formulations.

FIG. 3 is a bar graph illustrating the softening point of various asphalt formulations. Softening points were measured according ASTM D36 standards.

Figure 4:
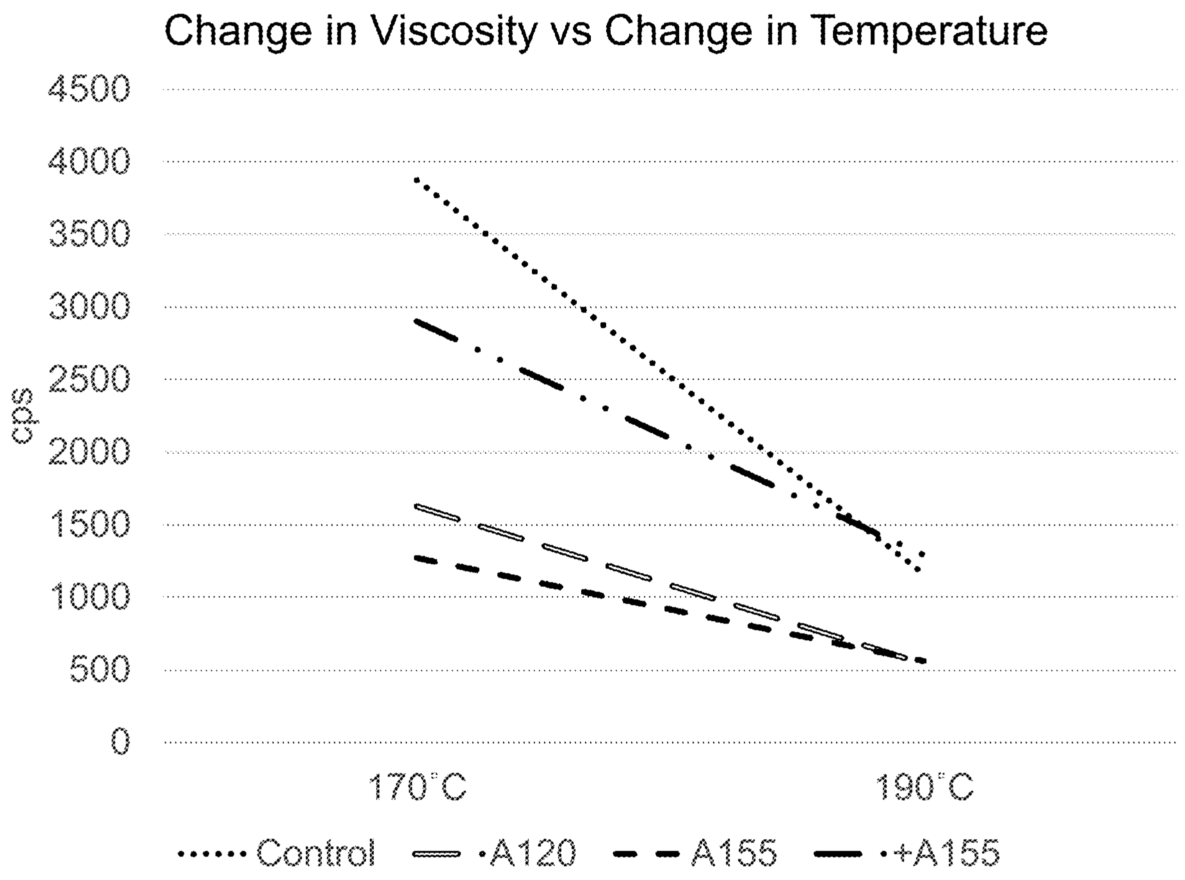
FIG. 4 is a line graph illustrating the change in viscosity over the change in temperature for various asphalt formulations.

FIG. 4 is a line graph illustrating the change in viscosity over the change in temperature for various asphalt formulations. Viscosity was measured according ASTM D4402 standards.

Figure 5:
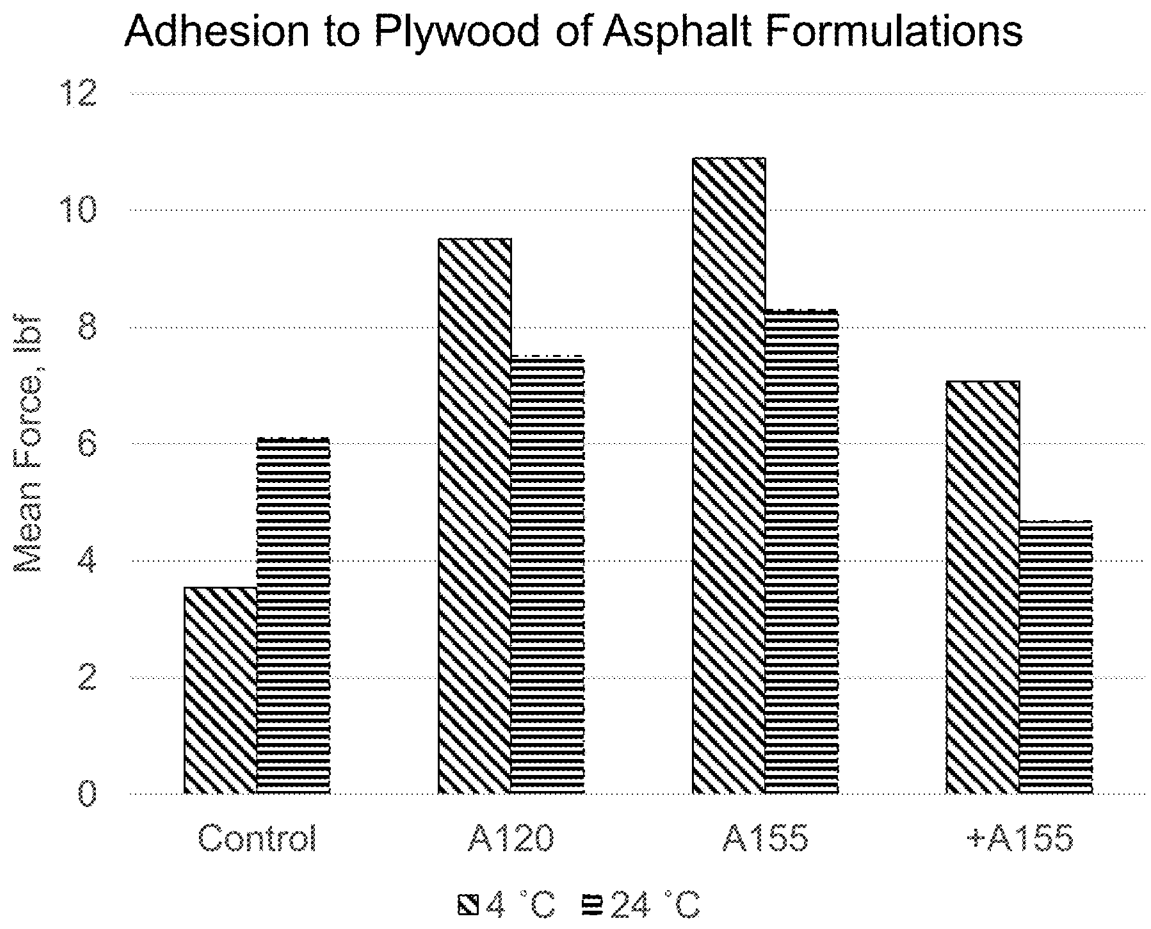
FIG. 5 is a bar graph illustrating adhesive strength of various asphalt formulations at various temperatures.

FIG. 5 is a bar graph illustrating adhesive strength of various asphalt formulations at various temperatures. Adhesion was measured according ASTM D1970-7.4 standards.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A peel-and-stick sheet comprising in order:
- a top layer;
- a top compound layer;
- a fiberglass mat layer;
- a bottom compound layer comprising an asphalt formulation; and
- a plastic release film layer, wherein said bottom compound layer is an adhesive layer,
- wherein said asphalt formulation comprises a wax and sulfur,
- wherein said wax is made by catalytic depolymerization of a recycled polyethylene, wherein said top compound layer comprises a first asphalt formulation, wherein said first asphalt formulation comprises a first wax, and wherein said first wax is made by catalytic depolymerization of a recycled polypropylene.

2. The peel-and-stick sheet of claim 1, wherein said top layer is a plastic film.

3. The peel-and-stick sheet of claim 1, wherein said top layer is made of a granulated material.

4. The peel-and-stick sheet of claim 1 wherein said wax has a melting point between and inclusive of 115-170° C.

5. The peel-and-stick sheet of claim 1 wherein said wax has a melting point between and inclusive of 60-170° C.

6. The peel-and-stick sheet of claim 1 wherein said asphalt formulation further comprises a styrene-butadiene-styrene.

7. The peel-and-stick sheet of claim 1 wherein said asphalt formulation further comprises a filler.

* * * * *